J. VON SCHWARZ.
Gas Burner.
No. 20,966.
Patented July 20, 1858.
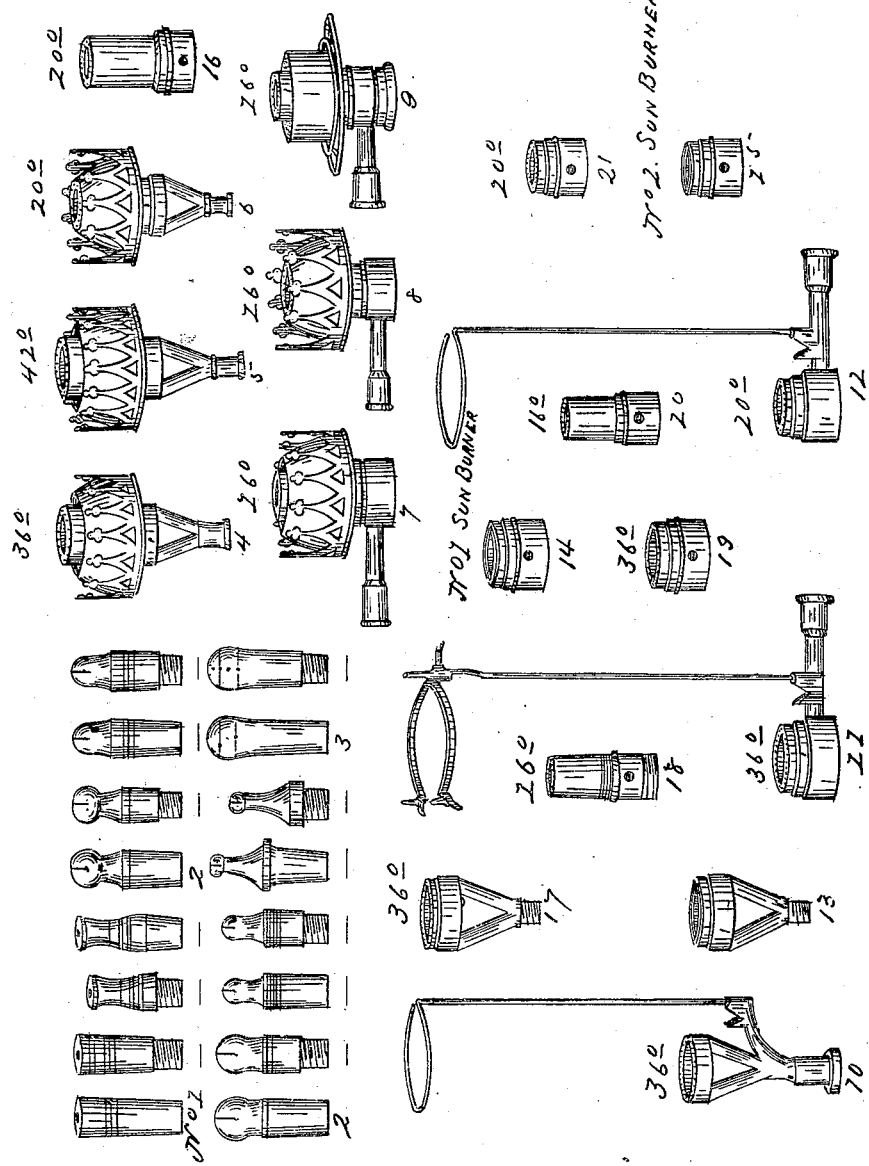

UNITED STATES PATENT OFFICE.

J. VON SCHWARZ, OF NUREMBERG, BAVARIA.

MANUFACTURE OF STEATITE ARTICLES.

Specification of Letters Patent No. 20,966, dated July 20, 1858.

*To all whom it may concern:*

Be it known that I, J. VON SCHWARZ, of Nuremberg, in the Kingdom of Bavaria, have invented an improved method of manufacturing useful articles from the natural product known as "steatite," by which I am enabled to produce any desired shape of article and then impart to the same an intense degree of hardness and a capacity for resisting high temperatures; and I do hereby declare that the following is a full and exact description of said invention.

The accompanying drawings represent various forms of gas-burners which I have manufactured from steatite by the aforesaid method, and which I term patent lava-gas-burners.

I first shape the crude steatite into the desired forms, either of gas-burners or any other articles, by any suitable mechanical means; then I subject the said articles to the action of a drying heat for such a length of time as may be necessary to bring them to a degree of hardness that will enable them to be finely finished and polished; then, after said articles have been mechanically finished, I place them in some fatty substance and subject them to a roasting operation for the purpose of rendering their surfaces impervious to atmospheric influences, and then I place the said articles in a crucible and subject them to the action of as high a degree of heat as can be safely brought to bear upon them without endangering the perfection of their outlines by fusion; which heating operation I continue until the aforesaid articles have been brought to a flint-like hardness, when they will be ready for use as soon as they have been permitted to cool down to a natural temperature.

What I claim as my invention and desire to secure by Letters Patent, is—

Preparing gas-burners, or other articles of manufacture, from the natural substance known as steatite in such a manner as to give to said articles an intense degree of hardness and also a capacity to resist high temperatures, substantially as herein set forth.

The above specification of my improved process of hardening articles made from the natural substance called steatite, signed this 24th day of April 1858.

J. VON SCHWARZ.

Witnesses:
 FRIEDR. HERTEL,
 J. GRUNDHESS.